(12) United States Patent
Park et al.

(10) Patent No.: US 6,778,234 B2
(45) Date of Patent: Aug. 17, 2004

(54) LIQUID CRYSTAL DISPLAY DEVICE

(75) Inventors: Kwan-sun Park, Kyungki-do (KR);
Jae-eun Jang, Kyungki-do (KR)

(73) Assignee: Samsung SDI Co., Ltd., Suwon-si (KR)

( * ) Notice: Subject to any disclaimer, the term of this patent is extended or adjusted under 35 U.S.C. 154(b) by 308 days.

(21) Appl. No.: 09/825,937

(22) Filed: Apr. 5, 2001

(65) Prior Publication Data

US 2001/0035922 A1 Nov. 1, 2001

(30) Foreign Application Priority Data

Apr. 27, 2000 (KR) ........................................ 2000-22467

(51) Int. Cl.$^7$ .......................................... G02F 1/1335
(52) U.S. Cl. ........................................ 349/62; 349/108
(58) Field of Search ............................. 349/62, 64, 71, 349/108

(56) References Cited

U.S. PATENT DOCUMENTS

| | | | | |
|---|---|---|---|---|
| 4,031,541 A | * | 6/1977 | Arisawa et al. | 348/803 |
| 4,920,409 A | * | 4/1990 | Yamagishi | 348/791 |
| 5,688,551 A | * | 11/1997 | Littman et al. | 427/64 |
| 5,760,858 A | * | 6/1998 | Hodson et al. | 349/61 |
| 6,025,894 A | * | 2/2000 | Shirasaki et al. | 349/69 |
| 6,424,093 B1 | * | 7/2002 | Mir et al. | 315/169.3 |

FOREIGN PATENT DOCUMENTS

JP  HEI13-35662  2/2000
KR  U1999-009289  3/1999

* cited by examiner

Primary Examiner—Tarifur R. Chowdhury
Assistant Examiner—P. R. Akkapeddi
(74) Attorney, Agent, or Firm—Burns, Doane, Swecker & Mathis, L.L.P.

(57) ABSTRACT

A liquid crystal display including a liquid crystal panel and a backlight. The liquid crystal panel has a front plate and a rear plate between which liquid crystal is interposed, wherein electrodes for driving the liquid crystal on a pixel-by-pixel basis, pixel electrodes corresponding to the common electrodes, and thin film transistors (TFTs) for driving the pixel electrodes are installed on the inner surface of each of the front and rear plates. The backlight has a front plate and a rear plate, wherein a plurality of R, G and B anode electrodes, on which fluorescent layers are formed, are formed in parallel on the front plate, cathode electrodes corresponding to the anode electrodes are formed on the rear plate, and light emitting units for colors according to the anode electrodes and the cathode electrodes are installed to provide light of each of R, G and B colors to each pixel of the liquid crystal panel. Color pixels are formed on a liquid crystal panel to match one pixel with backlight of three colors, instead of unit pixels formed by colors on the liquid crystal panel. Thus, the opening ratio of the liquid crystal panel increases, and the integration density thereof can be reduced, thereby simplifying the production process of the liquid crystal panel and reducing the manufacturing costs for the liquid crystal panel. In particular, the yield greatly improves.

11 Claims, 6 Drawing Sheets

LIQUID CRYSTAL DISPLAY DEVICE

This application claims priority under 35 U.S.C. §§ 119 and/or 365 to 00-22467 filed in Republic of Korea on Apr. 27, 2000; the entire content of which is hereby incorporated by reference.

BACKGROUND OF THE INVENTION

1. Field of the Invention

The present invention relates to liquid crystal display (LCD) devices, and more particularly, to a liquid crystal display device adopting a field emission device as a backlight.

2. Description of the Related Art

Figure 1:
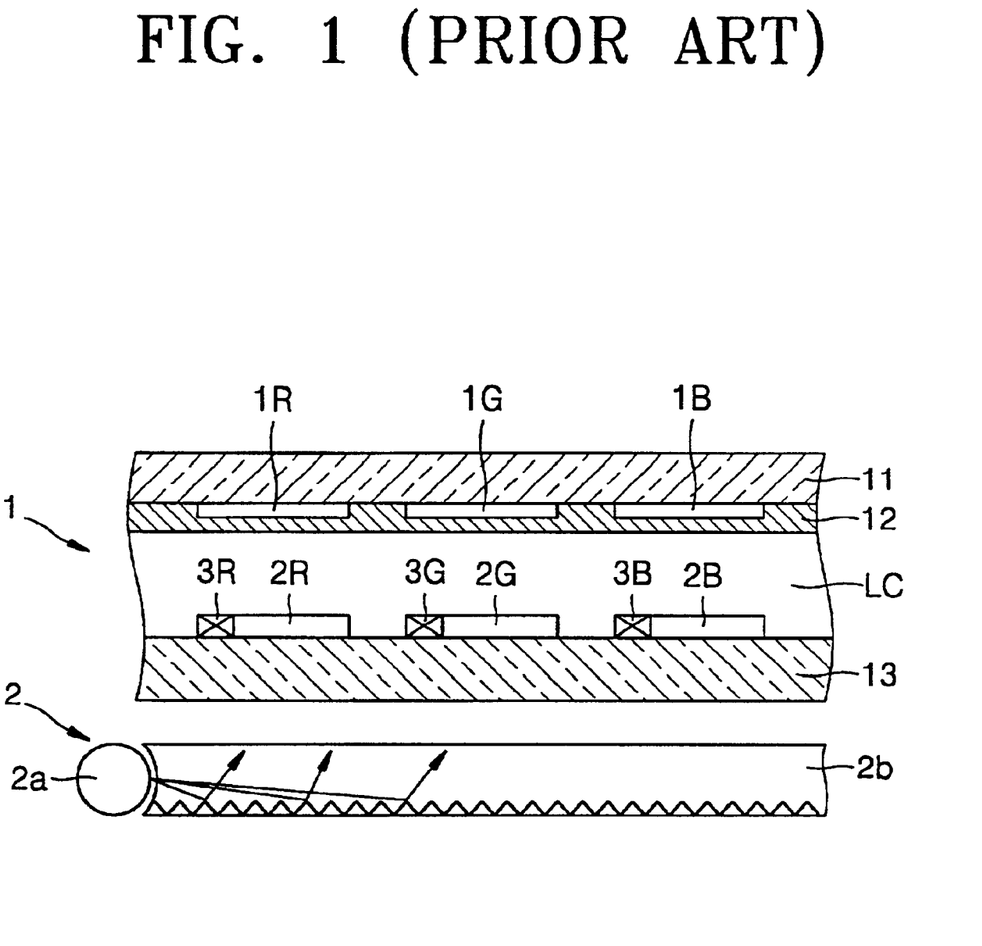
FIG. 1 is a cross-sectional view schematically illustrating the structure of a general liquid crystal display according to the prior art.

As shown in FIG. 1, a conventional LCD device has a structure in which a backlight 2 adopting a cold cathode lamp 2a and a light plate 2b is installed to the rear of a liquid crystal panel 1. The backlight 2 provides white light. In the liquid crystal panel 1, three unit pixels of red, green and blue for which three color filters 1R, 1G and 1B are installed, respectively, constitute a color pixel. The color filters 1R 1G and 1B are installed at predetermined intervals on the inner surface of a front plate 11, and a common electrode 12 is formed on the resultant structure of the front plate 11. Pixel electrodes 2R, 2G and 2B for the color filters 1R, 1G and 1B, respectively, and thin film transistors (TFTs) 3R, 3G and 3B for driving the pixel electrodes 2R, 2G and 2B, respectively, are installed on the inner surface of a rear plate 13 spaced a predetermined interval apart from the front plate 11. A liquid crystal LC is interposed between the front plate 11 and the rear plate 13.

In the above-described conventional TFT LCD, the unit pixels switch incident white light to determine whether the white light passes through the unit pixels, and only color light within a given wavelength band is transmitted by a predetermined color filter installed on each of the unit pixels.

According to this structural characteristics, power consumption in the LCD mostly occurs in the backlight. In particular, in the backlight, light emitted from the lamp is considerably absorbed into the light plate by a reflection plate and a scattering structure installed on the light plate, and then proceeds toward the panel. Hence, the amount of light actually used for image display is smaller than power consumed, thus degrading the efficiency of power consumption.

In the conventional LCD, only one color light among three color components of white light is selected by the color filters installed on the liquid crystal panel, so that the light efficiency is very low. Also, the manufacturing costs of color filters which are installed on an LCD occupy a large portion of the total manufacturing cost for a liquid crystal display device.

Furthermore, since a color pixel is actually constituted by the combination of three color pixels, a single color pixel requires three TFTs and three pixel electrodes. In particular, since a TFT occupies an area by one side of a pixel electrode, the aperture efficiency is greatly degraded by the TFT, and accordingly the luminance is deteriorated.

The conventional LCD having such an inefficient structure can be improved by U.S. Pat. No. 5,760,858 which discloses an LCD in which a triode field emission device is coupled to a liquid crystal panel. This LCD uses a field emission device as a backlight, so that it can be driven with low power, and can provide uniform highly-luminant light over the entire surface without reflection plates. Also, separated color light rather than single white light is radiated to a liquid crystal by red, green and blue fluorescent materials, so that no color filters are needed, increasing the light efficiency and reducing the manufacturing costs of LCD. However, since a general triode field emission device must be manufactured to manufacture an LCD having such a structure, the LCD has no great advantages except that the circuit configuration is simple, compared to an LCD which forms a video image using an existing field emission device. This is because the costs of an LCD rather than the costs for establishing the circuit of a field emission device are expected to occupy the majority of the total costs for an image driving apparatus. Also, since R, G and B pixels are formed on a backlight to correspond to the R, G and B pixels on a liquid crystal panel, if a panel has high definition, each of the components of the backlight also must have high definition. Thus, the manufacture of a backlight is complicated, and the yield is low.

Figure 2:
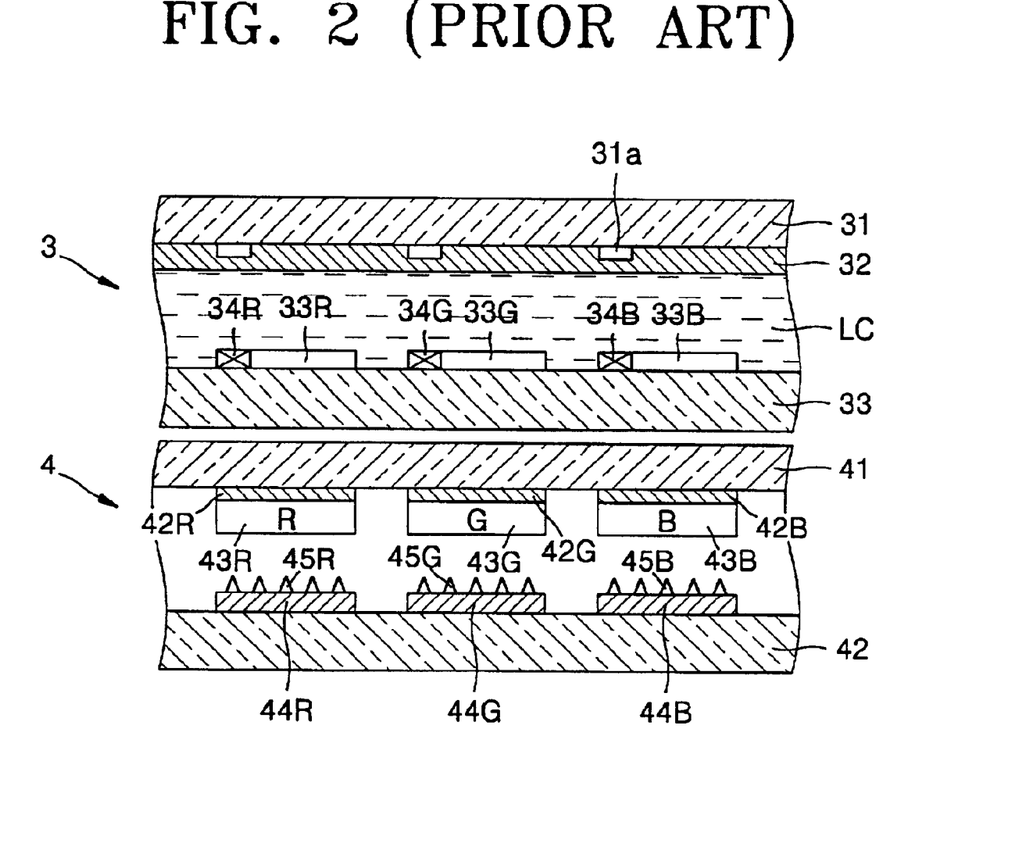
FIG. 2 is a cross-sectional view schematically illustrating the structure of a conventional liquid crystal display adopting a backlight having a diode field emission device.

These problems are solved by applying a planar field emission device having a diode structure with a cathode electrode and an anode electrode such that separated red, green and blue light can be simply provided. Referring to FIG. 2, a backlight 4 having a diode field emission device is installed to the rear of a liquid crystal panel 3. Black matrixes 31a are formed at intervals of a unit pixel on the inner surface of a front plate 31 in the liquid crystal panel 3, and a common electrode 32 is formed on the resultant structure of the front plate 31. Pixel electrodes 33R, 33G and 33B, each facing the area between adjacent black matrixes 31a, and TFTs 34R, 34G and 34B for driving the pixel electrodes 33R, 33G and 33B, respectively, are installed on the inner surface of a rear plate 33. Liquid crystal (LC) sandwiches between the front plate 31 and the rear plate 33.

The backlight 4 includes a front plate 41, on the inner surface of which anode electrodes 42R, 42G and 42B for unit pixels and R, G and B fluorescent layers 43R, 43G and 43B on the anode electrodes 42R, 42G and 42B are installed, and a rear plate 42, on the inner surface of which R, G and B cathode electrodes 44R, 44G and 446 corresponding to the anode electrodes 42R, 42G and 42B are installed. R, G and B electron emitting sources 45R, 45G and 45B are formed of graphite, diamond, carbon nanotube, or the like, on the cathode electrodes 44R, 44G and 44B, respectively, by a simple thin film process such as a printing method or an electrophoretic method.

In the backlight 4 having this diode field emission device, the rear plate 42 (that is, a cathode plate), on which electron emitting sources are formed on cathode electrodes by a thin film process, is coupled to the front plate 41 (that is, an anode plate) on which the R, G and B fluorescent layers 43R, 43G and 43B and the anode electrodes 42R, 42G and 42B are formed. Thus, the backlight 4 is easily manufactured, and, particularly, a large backlight can be manufactured at low costs. Also, since the backlight radiates red, blue and green light separated per unit pixel to a liquid crystal panel, a liquid crystal panel requires no existing color filters, so that it has a simple structure and performs a simple circuit operation. The backlight having such a diode field emission device provides R, G and B light separated per pixel, is cheap, large, highly efficient and highly luminant, and operates with low power, so that it is an epoch-making technique in which no color filters are required, and the light efficiency is high, in contrast with existing LCDs.

Figure 3:
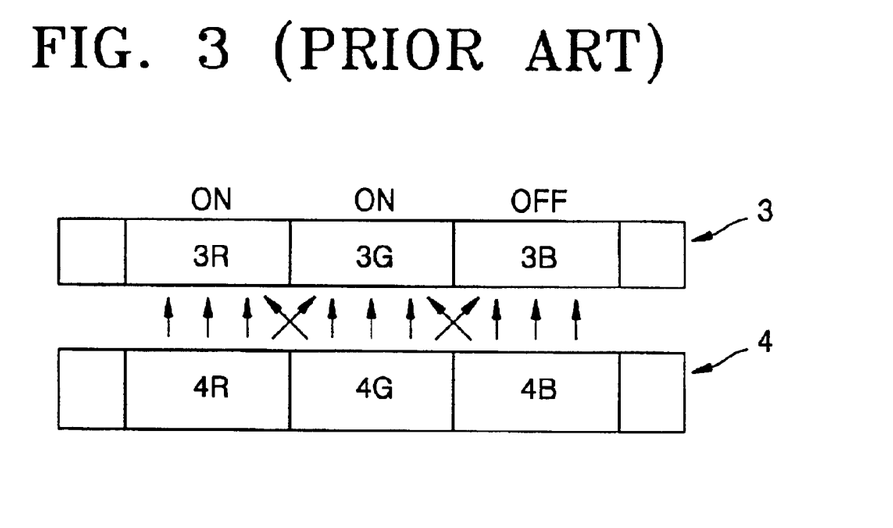
FIG. 3 is a schematic diagram illustrating the cross talk between pixels in the liquid crystal display shown in FIG. 2.

However, as shown in FIG. 3, when separated red, blue and green light is radiated from the backlight 4 to a liquid crystal panel, light radiated from a fluorescent material on each unit pixel disperses while passing through a glass substrate layer at the upper side. For example, as shown in FIG. 3, when a red pixel 3R and a green pixel 3G in a liquid crystal panel 3 are maintained in an on state, some of light from a red area 4R and a green area 4G in the backlight 4 at the lower side enter in wrong areas in the liquid crystal panel 3 due to scattering. Scattering occurs because the front plate 41 of the backlight 4 must be 1000 $\mu$m or thicker to maintain the internal vacuum of the backlight 4. The generation of the cross talk prevents formation of a clear image.

This cross talk serves as a disadvantage, in contrast with an existing LCD in which color filters are located at the end in the direction of traveling of light. The LCD adopting the backlight 4 also has unit pixels for colors each having a TFT like the existing TFT-LCDs, so that it does not contribute to improve the aperture efficiency. Furthermore, since the backlight 4 has R, G and B pixels for the R, G and B pixels on a liquid crystal panel, if a panel has high definition, the backlight also must have high definition. Thus, the manufacture of the backlight is complicated, and the yield is low.

SUMMARY OF THE INVENTION

To solve the above problem, an objective of the present invention is to provide a liquid crystal display which has improved color purity due to the removal of color filters and has high light efficiency.

Another objective of the present invention is to provide a liquid crystal display which has high aperture efficiency and thus has increased light efficiency.

Still another objective of the present invention is to provide a liquid crystal display which is manufactured at a small cost and with a high yield since its backlight is easily manufactured and driven.

Yet another objective of the present invention is to provide a liquid crystal display which lowers the integration density of a liquid crystal panel, and thus is easily manufactured with a high yield.

To achieve the above objectives, the present invention provides a liquid crystal display including: a liquid crystal panel having a front plate and a rear plate between which liquid crystal sandwiches, wherein common electrodes for driving the liquid crystal on a pixel-by-pixel basis, pixel electrodes corresponding to the common electrodes, and thin film transistors (TFTs) for driving the pixel electrodes are installed on the inner surface of each of the front and rear plates; and a backlight having a front plate and a rear plate, wherein a plurality of R, G and B anode electrodes on which fluorescent layers are formed are formed in parallel on the front plate, R, G and B cathode electrodes corresponding to the anode electrodes are formed on the rear plate, and light emitting units for colors according to the R, G and B anode electrodes and the R, G and B cathode electrodes are installed to provide light of R, G and B colors to each pixel of the liquid crystal panel.

In the liquid crystal display according to the present invention, preferably, the R, G and B anode electrodes in the backlight are arranged to correspond to the pixels of the liquid crystal panel, and the cathode electrodes and the anode electrodes are formed opposite to and in parallel to each other. Also, preferably, one of the R, G and B anode electrodes is connected to a first bus line which is formed on one portion of the inner surface of the front plate of the backlight, and the remainders are commonly connected to a second bus line which is formed on the other portion of the inner surface of the front plate of the backlight, and two of the R, G and B cathode electrodes corresponding to the R, G and B anode electrodes are commonly connected to a third bus line, and the remainder is connected to a fourth bus line. It is also preferable that the first and second bus lines are installed in parallel on both sides of an array of the R, G and B anode electrodes.

In this liquid crystal display, preferably, the cathode electrodes and the anode electrodes cross each other at right angles, the cathode electrodes are commonly connected to the first bus line which is formed on the rear plate of the backlight, and the R, G and B anode electrodes are grouped by colors, and the R anode electrodes, the G anode electrodes and the B anode electrodes are connected to second, third and fourth bus lines, respectively, which are formed on the front plate of the backlight. Also, one of the second, third and fourth bus lines is installed in parallel to the remaining two bus lines in the direction opposite to the directions of installation of the remaining two bus lines. Furthermore, one of two bus lines, that are adjacent to each other in parallel, among the second, third and fourth bus lines, intersects with anode electrodes connected to the other bus line, and an electrical insulative layer is installed at the intersected portions.

BRIEF DESCRIPTION OF THE DRAWINGS

The above objectives and advantages of the present invention will become more apparent by describing in detail preferred embodiments thereof with reference to the attached drawings in which.

DESCRIPTION OF THE PREFERRED EMBODIMENTS

Figure 4:
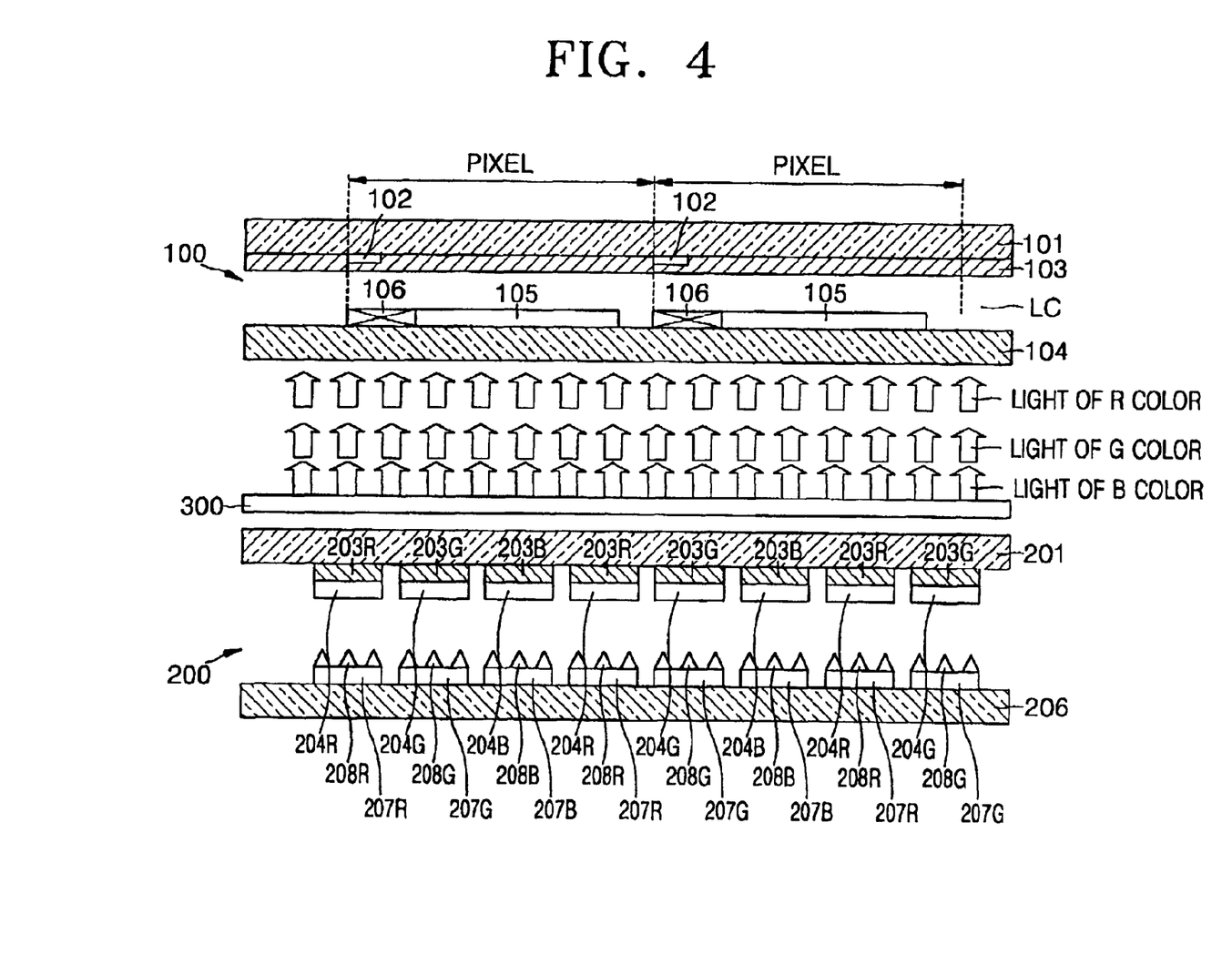
FIG. 4 is a cross-sectional view schematically illustrating an embodiment of a liquid crystal display according to the present invention.

Referring to FIG. 4, a liquid crystal display according to the present invention includes a liquid crystal panel 100 and a backlight 200 which is installed to the rear of the liquid crystal panel 100 and has a diode field emission device. Black matrixes 102 are formed at intervals of a pixel on the inner surface of a front plate 101 of the liquid crystal panel 100, and a common electrode 103 is formed on the resultant structure of the front plate 101. Pixel electrodes 105 facing the area between adjacent black matrixes 102, and thin film transistors (TFTs) 106 for driving the pixel electrodes 105 are formed on the inner surface of a rear plate 104. A liquid crystal LC sandwiches between the front plate 101 and the rear plate 104.

In the backlight 200, a plurality of R, G and B anode electrodes 203R, 203G and 203B are alternately aligned on the inner surface of the front plate 201, and R, G and B fluorescent layers 204R, 204G and 204B are formed on the R, G and B anode electrodes 203R, 203G and 203B, respectively. R, G and B cathode electrodes 207R, 207G and 207B corresponding to the R, G and B anode electrodes 204R, 204G and 2046, respectively, are formed on the inner surface of the rear plate 206. R, G and B electron emitting sources 208R, 208G and 208B are formed of graphite, diamond or carbon nanotube on the cathode electrodes 207R, 207G and 207B, respectively.

A diffusion plate 300 for allowing light from the backlight 200 to be evenly incident upon the liquid crystal panel 100 by scattering and diffusing the light proceeding toward the liquid crystal panel 100 is installed between the liquid crystal panel 100 and the backlight 200.

FIG. 4 hierarchically shows light of R color, light of G color and light of B color in order to facilitate understanding of a structure in which the light of R color, the light of G color and the light of B color are sequentially emitted from the backlight 200 and incident upon the liquid crystal panel 100.

In a liquid crystal display (LCD) according to the present invention having such a structure, a single pixel serves as three pixels for expressing three colors in the prior art, and light of R color, light of G color and light of B color from the backlight 200 is incident upon each single pixel. That is, in the prior art, pixels are divided by colors, and each pixel has a pixel electrode and a TFT. However, according to the present invention, a single pixel serves to express three colors.

Figure 5:
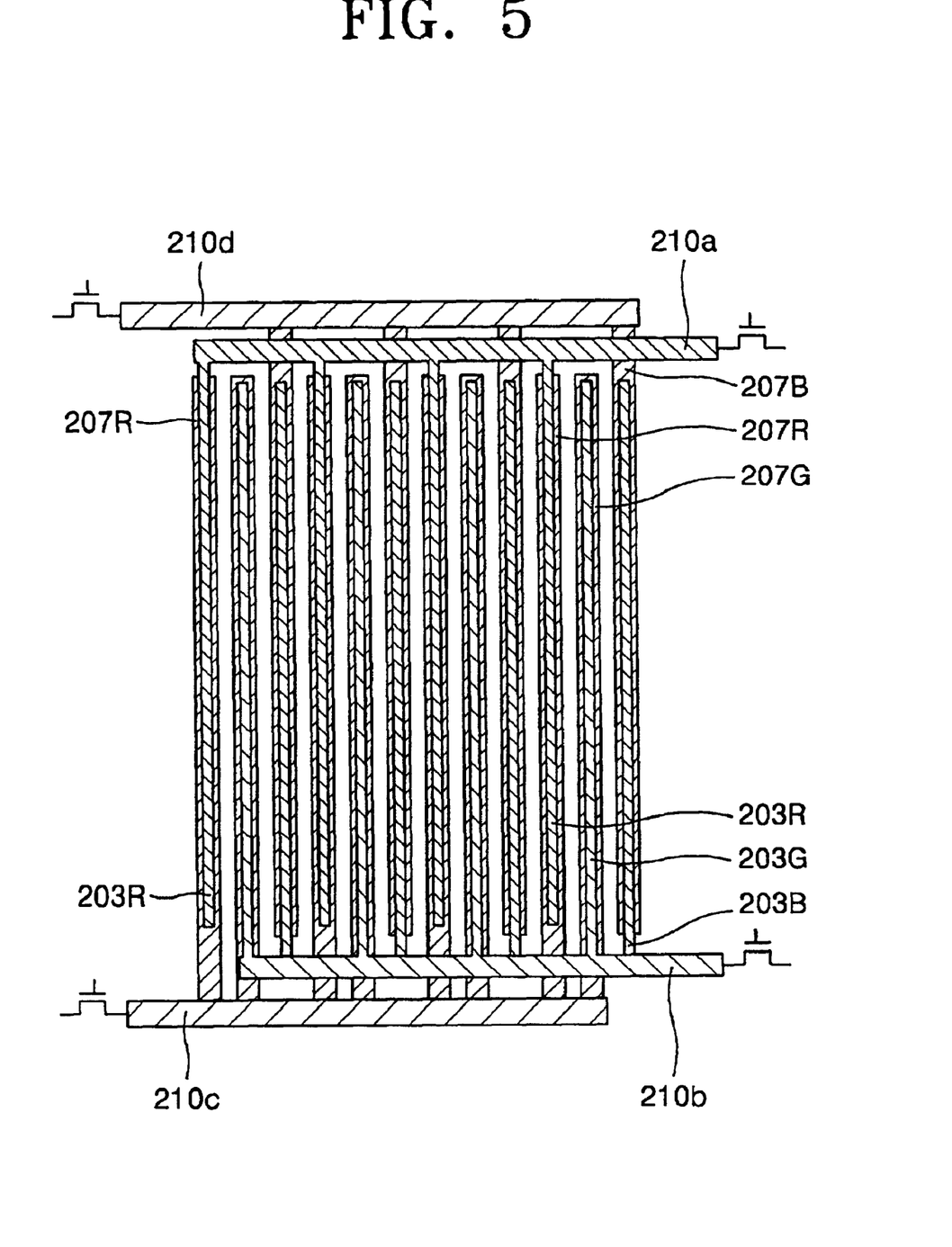
FIG. 5 is a plan view of a first embodiment of the electrode arrangement structure of a field emission backlight in a liquid crystal device according to the present invention.

FIG. 5 shows a first embodiment of the arrangement structure of cathode electrodes and anode electrodes in the backlight 200. Referring to FIG. 5, cathode electrodes 207R, 207G and 207B are aligned in parallel with corresponding anode electrodes 203R, 203G and 203B, respectively, and the cathode electrodes 207R, 207G and 207B and the anode electrodes 203R, 203G and 203B are separated and connected to first, second, third and fourth bus lines 210a, 210b, 210c and 210d. To be more specific, the first and second bus lines 210a and 210b are formed on the inner surface of the front plate 201. The R anode electrode 203R is connected to the first bus line 210a, and the G and B anode electrodes 203G and 203B are commonly connected to the second bus line 210b. The third and fourth bus lines 210c and 210d are formed on the inner surface of the rear plate 206. The R and G cathode electrode 207R and 207G are commonly connected to the third bus line 210c, and the B cathode electrode 207B is connected to the fourth bus line 210d.

In this electrode arrangement structure, line luminescence of a predetermined color occurs due to field emission in units of R color lines, G color lines or B color lines. For example, when the first and third bus lines 210a and 210c are selected, lines of R color radiate due to the R anode electrodes 203R and the R cathode electrodes 207R. When the second and third bus lines 210b and 210c are selected, lines of G color radiate due to the G anode electrodes 203G and the G cathode electrodes 207G. When the third and fourth bus lines 210c and 210d are selected, lines of B color radiate due to the B anode electrodes 203B and the B cathode electrodes 207B.

Figure 6:
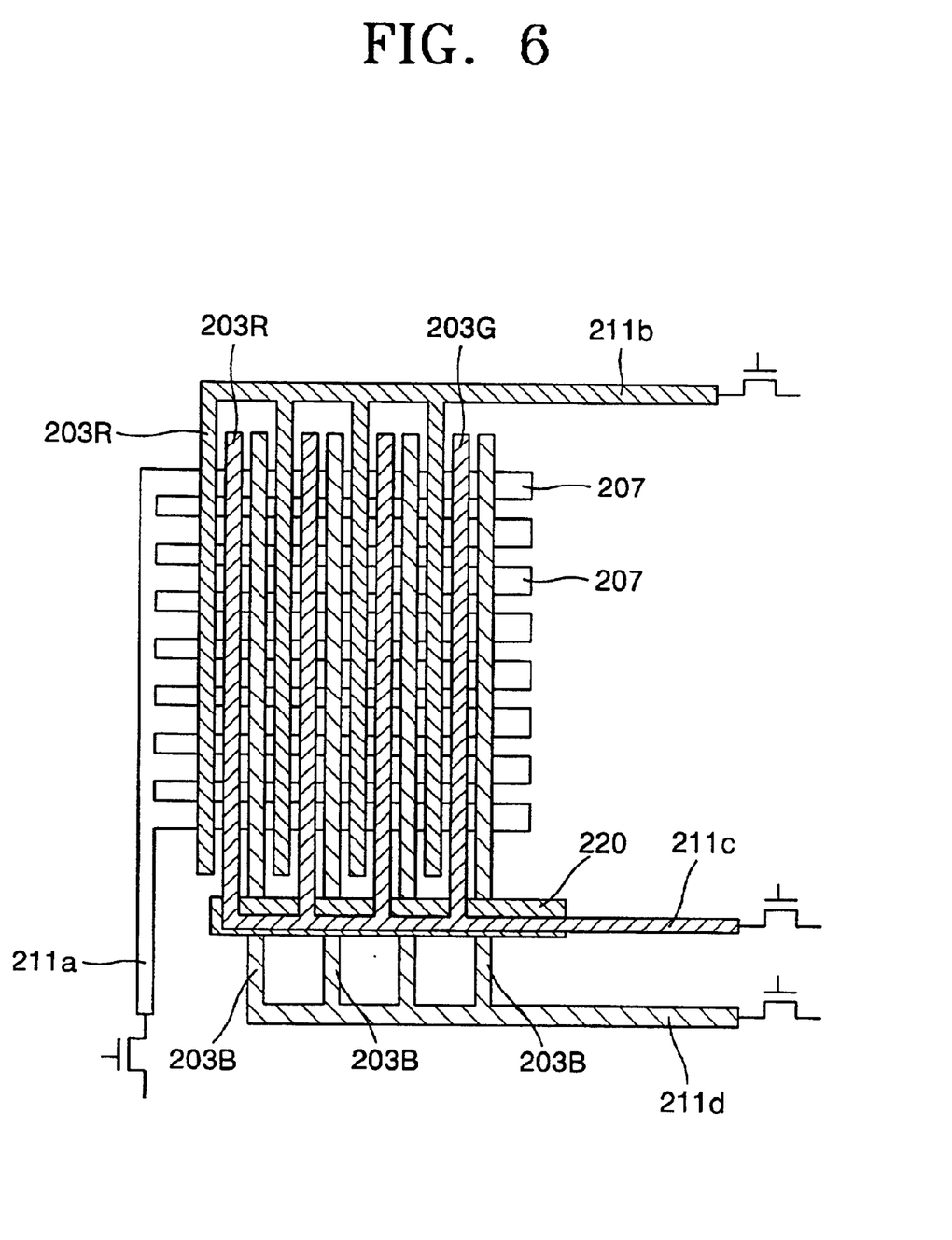
FIG. 6 is a plan view of a second embodiment of the electrode arrangement structure of a field emission backlight in a liquid crystal device according to the present invention.

FIG. 6 shows a second embodiment of the electrode arrangement structure of the backlight 200 in a liquid crystal device according to the present invention. Referring to FIG. 6, cathode electrodes 207 formed on the rear plate 206 are commonly connected to a first bus electrode 211a. R, G and B anode electrodes 203R, 203G and 203B formed on the front plate 201 cross with the cathode electrodes 207 at right angles. The R anode electrodes 203R are commonly connected to a second bus line 211b formed on the inner surface of the front plate 201, the G anode electrodes 203G are commonly connected to a third bus line 211c formed on the inner surface of the front plate 201, and the B anode electrodes 203B are commonly connected to a fourth bus line 211d formed on the inner surface of the front plate 201. According to this structure, each of the cathode electrodes 207 switches R, G and B colors, instead of being separated for colors like the R, G and B cathode electrodes 207R, 207G and 207B as shown in FIGS. 4 and 5. In FIG. 6, reference numeral 220 denotes an insulative layer for electrically separating the G anode electrodes 203G from the B anode electrodes 203B.

According to this electrode arrangement structure, with the first bus line 211a being a common line, if the second bus line 211b is selected, red light radiates throughout due to the field emission at the intersections of the cathode electrodes 27 commonly connected to the first bus line 211a with the R anode electrode 203R connected to the second bus line 211b. If the third bus line 211c is selected, green light radiates throughout due to the field emission at the intersections of the cathode electrodes 27 with the G anode electrode 203G connected to the third bus line 211c. If the fourth bus line 211d is selected, blue light radiates throughout due to the field emission at the intersections of the cathode electrodes 27 with the B anode electrode 203B connected to the fourth bus line 211d.

Figure 7A:
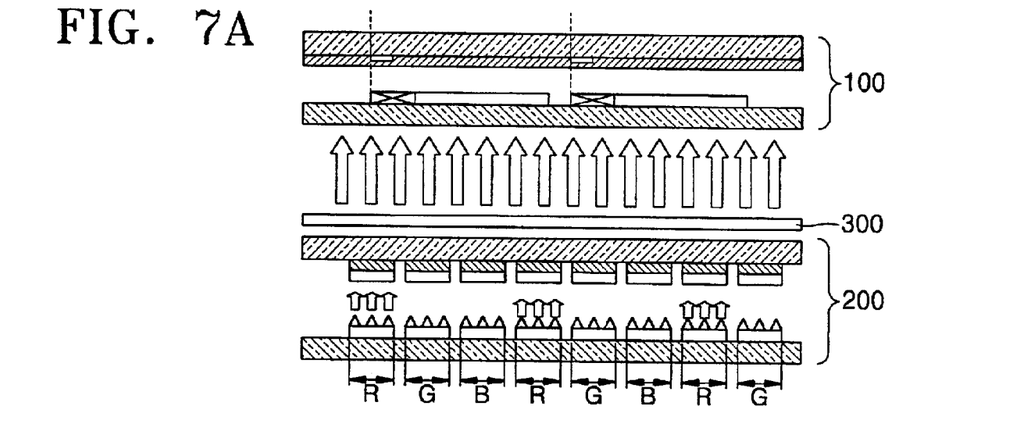
FIGS. 7A, 7B and 7C show sequential incidence of light of R, G and B colors from a backlight upon the pixels of a liquid crystal panel, in a liquid crystal display according to the present invention.
Figure 7B:
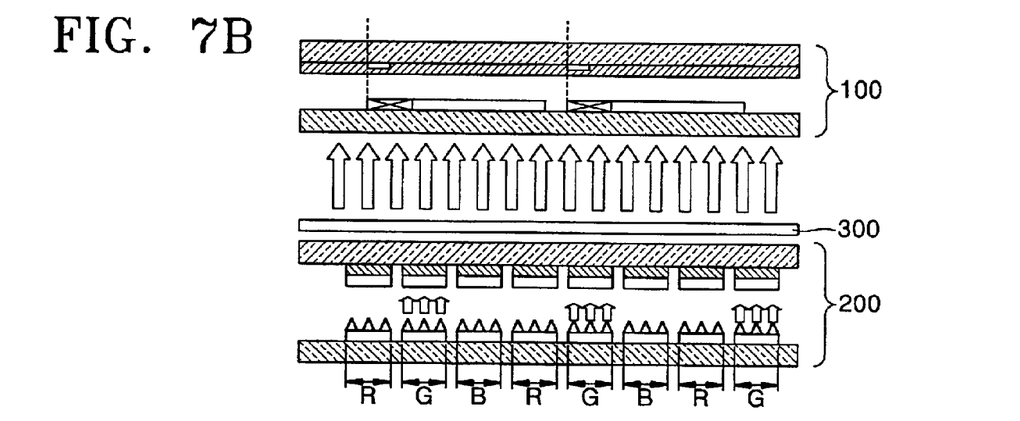
Figure 7C:
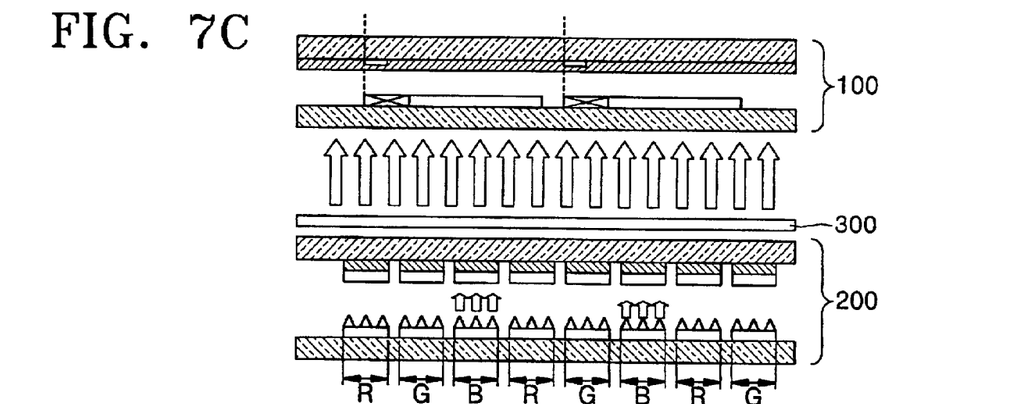

Referring to FIG. 7A, if areas R in the backlight 200 emit light, red light is generated from the fluorescent material in the areas R, passes through a dispersion plate 300 to thus have a uniform distribution all over the surface, and is incident upon the pixels on the liquid crystal panel 100. In sequence, as shown in FIG. 7B, if areas B in the backlight 200 emit light, blue light from the areas B pass through the diffusion plate 300, and then is incident upon the pixels on the liquid crystal panel 100. As shown in FIG. 7C, if areas G in the backlight 200 emit light, green light from the areas G is incident upon the pixels on the liquid crystal panel 100. That is, red light, blue light and green light are sequentially driven and radiated by colors or lines according to a selected bus line, instead of being radiated simultaneously. According to the present invention described above, even though light generated from a backlight is scattered while passing through a front plate, only light of the same color is evenly incident upon the pixels, thus preventing cross talk.

As for the above-described driving of a panel, when a moving picture is realized by driving a screen using 60 frames, that is, at 16.7 msec driving speed, a field sequential method of repeatedly driving R, G and B light sources each at 5.81 msec using the characteristics of a high-speedy light switch (1 msecdlgk) of the backlight is adopted. Here, when an ultra-speedy ferroelectric liquid crystal mode having a response speed of 1 msec or less (see U.S. Pat. No. 4367924, App. Phys. Lett., 36 899 (1980))is used as a light switch, a liquid crystal panel of a perfect moving picture can be obtained.

The above-described LCD according to the present invention has no color filters, and a single pixel on a panel switches R, G and B colors. Thus, the LCD according to the present invention has pixels, the number of which is reduced to a third of the number of pixels of a conventional LCD, and TFTs for the pixels. In particular, the backlight 200 according to the present invention can irradiate a desired line or color using four bus lines, as described above for example, so that a target image can be obtained by an uncomplicated circuit.

In particular, as described above, color pixels are formed on a liquid crystal panel to match one pixel with backlight of three colors, instead of unit pixels formed by colors on the liquid crystal panel. Thus, the opening ratio of the liquid crystal panel increases, and the integration density thereof can be reduced, thereby simplifying the production process of the liquid crystal panel and reducing the manufacturing costs for the liquid crystal panel. In particular, the yield greatly improves, and a perfect moving picture is obtained.

Although the invention has been described with reference to a particular embodiment, it will be apparent to one of ordinary skill in the art that modifications of the described embodiment may be made without departing from the spirit and scope of the invention.

What is claimed is:

1. A liquid crystal display comprising:
   a liquid crystal panel having a front plate and a rear plate between which liquid crystal is interposed, wherein common electrodes for driving the liquid crystal on a pixel-by-pixel basis are located on an inner surface of one of the front and rear plates, and, pixel electrodes corresponding to the common electrodes and thin film transistors (TFTs) for driving the pixel electrodes are installed on the inner surface of the other of the front and rear plates; and
   a backlight having a front plate and a rear plate, wherein a plurality of R, G and B anode electrodes, on which fluorescent layers are formed, are located in parallel on the front plate, cathode electrodes corresponding to the anode electrodes are formed on the rear plate, and light emitting units for colors according to the anode electrodes and the cathode electrodes are installed to provide light of each of R, G and B colors to each pixel of the liquid crystal panel.

2. The liquid crystal display of claim 1, wherein the liquid crystal operates in a mode having a response speed of 5.81 msec or less.

3. The liquid crystal display of claim 1, wherein light of R color, light of G color and light of B color are sequentially incident upon the liquid crystal panel, and the light of R color, the light of G color and the light of B color are controlled by the pixels on the liquid crystal panel.

4. The liquid crystal display of claim 1, wherein a diffusion plate for diffusing light is installed between the liquid crystal panel and the backlight.

5. The liquid crystal display of claim 1, wherein the cathode electrodes and the anode electrodes are formed opposite to and in parallel to each other.

6. The liquid crystal display of claim 5, wherein one of the R, G and B anode electrodes is connected to a first bus line which is formed on one portion of the inner surface of the front plate of the backlight, and the remaining anode electrodes are commonly connected to a second bus line which is formed on the other portion of the inner surface of the front plate of the backlight, and two of the R, G and B cathode electrodes corresponding to the R, G and B anode electrodes are commonly connected to a third bus line, and the remaining cathode electrode is connected to a fourth bus line.

7. The liquid crystal display of claim 6, wherein the first and second bus lines are installed in parallel on both sides of an array of the R, G and B anode electrodes.

8. The liquid crystal display of claim 1, wherein the cathode electrodes and the anode electrodes cross each other at right angles.

9. The liquid crystal display of claim 8, wherein the cathode electrodes are commonly connected to the first bus line which is formed on the rear plate of the backlight, and the R, G and B anode electrodes are grouped by colors, and the R anode electrodes, the G anode electrodes and the B anode electrodes are connected to second, third and fourth bus lines, respectively, which are formed on the front plate of the backlight.

10. The liquid crystal display of claim 8, wherein one of the second, third and fourth bus lines is installed in parallel to the remaining two bus lines in the direction opposite to the directions of installation of the remaining two bus lines.

11. The liquid crystal display of claim 10, wherein one of two bus lines, that are adjacent to each other in parallel, among the second, third and fourth bus lines, intersects with anode electrodes connected to the other bus line, and an electrical insulative layer is installed at the intersected portions.

* * * * *